US008712429B2

(12) United States Patent
Nagorniak

(10) Patent No.: US 8,712,429 B2
(45) Date of Patent: Apr. 29, 2014

(54) MANAGING DEVICE FUNCTIONALITY DURING PREDETERMINED CONDITIONS

(75) Inventor: David B. Nagorniak, Chapin, SC (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 514 days.

(21) Appl. No.: 12/208,975

(22) Filed: Sep. 11, 2008

(65) Prior Publication Data

US 2010/0062788 A1 Mar. 11, 2010

(51) Int. Cl.
*H04W 24/00* (2009.01)

(52) U.S. Cl.
USPC ... 455/456.1; 455/41.2; 455/41.3; 455/456.2; 455/456.3

(58) Field of Classification Search
USPC .............. 455/41.2, 41.3, 456.1, 456.2, 456.3; 340/669, 670; 702/142, 143
See application file for complete search history.

(56) References Cited

U.S. PATENT DOCUMENTS

| 5,950,125 | A | 9/1999 | Buhrmann et al. |
| 6,973,333 | B1* | 12/2005 | O'Neil ........................ 455/569.2 |
| 7,269,505 | B2 | 9/2007 | Zhao et al. |
| 2005/0197767 | A1* | 9/2005 | Nortrup ........................ 701/209 |
| 2007/0072553 | A1* | 3/2007 | Barbera ..................... 455/67.11 |
| 2007/0299601 | A1 | 12/2007 | Zhao et al. |
| 2009/0224931 | A1* | 9/2009 | Dietz et al. .................... 340/670 |

* cited by examiner

*Primary Examiner* — Manpreet Matharu

(74) *Attorney, Agent, or Firm* — Scott P. Zimmerman, PLLC

(57) ABSTRACT

Functionality of a mobile device depends on detected speed of the mobile device. Global positioning system (GPS) technology or tower triangulation may be used to estimate the speed of a mobile device. In addition, the geographic location of the mobile device may be estimated. A set of rules regarding when functionality of the mobile device should be limited is accessed and if the mobile device exceeds a threshold speed or is located in a restricted area, selected features of the mobile device are disabled. Incoming calls and outgoing calls may be restricted according to local regulations. Other features such as emergency dialing, hands-free operation of the mobile device, and playing audio files (e.g., MP3 music files) may remain functional regardless of the geographic location or estimated speed of the mobile device.

17 Claims, 5 Drawing Sheets

MANAGING DEVICE FUNCTIONALITY DURING PREDETERMINED CONDITIONS

BACKGROUND

1. Field of the Disclosure

The present disclosure relates to mobile devices, and more particularly, to modifying the functionality of mobile devices under predetermined conditions.

2. Description of the Related Art

Operating mobile devices (e.g., cellular telephones) under certain conditions may be dangerous or illegal. For example, it may be dangerous to use certain features of a cellular telephone while driving. Similarly, it may be illegal to operate a cellular telephone while in an airplane. If left to a user, rules and regulations may not be followed by the user regarding whether to operate a mobile device under such conditions.

DESCRIPTION OF THE EMBODIMENT(S)

Figure 1:
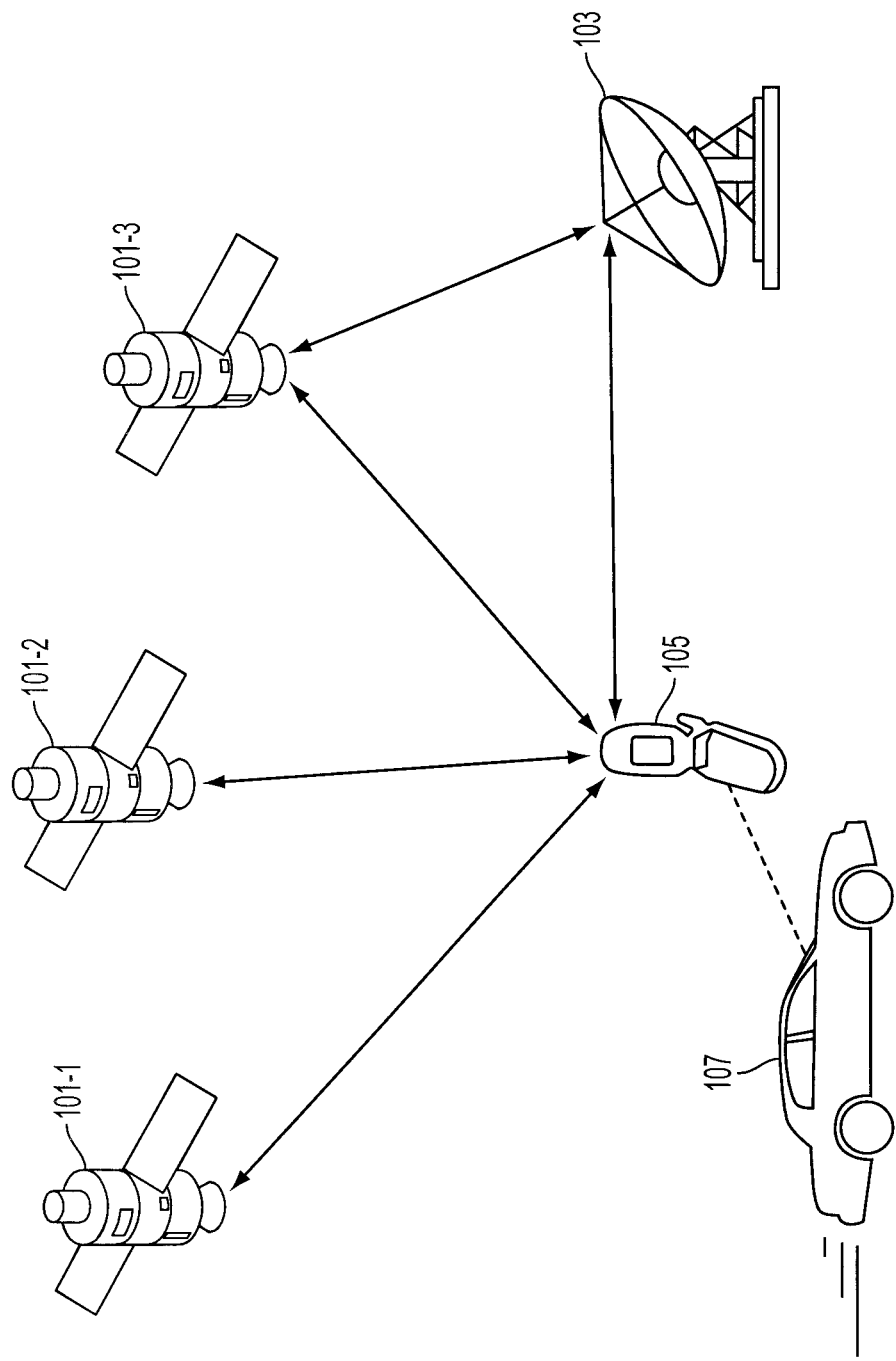
FIG. 1 illustrates an exemplary environment for detecting predetermined conditions using a satellite-based network and managing the use of mobile devices in accordance with disclosed embodiments.

In one aspect, a mobile device is disclosed that is suitable for cellular communication. The mobile device includes a speed determination subsystem to estimate the speed of the mobile device and a processor adapted to disable at least one feature of the mobile device if the speed exceeds a threshold speed. The speed determination subsystem may include satellite-based global positioning (GPS) capability or may estimate the speed of the mobile device using triangulation based on communication with radio towers. In some embodiments, the mobile device further includes a navigation system that remains functional regardless of the speed of the mobile device. The mobile device may further include an audio play subsystem that also does not have its features disabled if the mobile device exceeds a threshold speed. In some embodiments, the disabled features include cellular communication, incoming call reception, or outgoing call dialing. In some embodiments, hands-free incoming call answering or hands-free outgoing call dialing may remain functional. For safety purposes, some embodiments may not disable emergency number dialing such as 911 dialing. Other features that may be disabled in some embodiments include sending or receiving text messages such as short messaging service (SMS) messages or e-mail messages. The mobile device may disable one or more features if the geographic location of the mobile device is within a restricted geographic area such as a school zone.

In another aspect, a method of providing wireless communication services is disclosed that includes dynamically estimating the speed of a wireless communication device and modifying the availability of a wireless communication service when the estimated speed exceeds a threshold speed. The method may further include dynamically estimating a location of the wireless communication device and modifying availability of the wireless communication service depending on the location. In some embodiments, the availability of an emergency number communication service is maintained regardless of the estimated speed. In addition, the availability of hands-free features may be maintained regardless of the estimated speed. Estimating the speed of the wireless communication device may be performed using GPS or tower triangulation, as examples.

In still another aspect, a communication system is disclosed that includes a speed determination system, a processor for modifying a feature set of a mobile device if the speed exceeds a threshold speed, and an automated notification system to provide an indication that the feature set is disabled. The indication that the feature set has been disabled may be provided to a user of the mobile device, provided to a person that is attempting to call the mobile device, or provided to both. The speed determination system may be local to the mobile device and may use GPS, tower triangulation, or both. Alternatively, the speed determination system may be integrated into or in communication with a provider network that is remote from the mobile device, which may be enabled to receive speed data from the provider network. The communication system may further comprise a position determination system that estimates a geographic location of the mobile device. Depending upon the geographic location of the mobile device, a feature set may be disabled based on rules data relevant to the geographic location of the mobile device.

Disclosed embodiments relate to managing the operation of a mobile device (e.g., cellular telephone) based upon a determination of the speed of the mobile device. As an example of an operation of the mobile device that is managed, the mobile device may be prevented from receiving or making telephone calls if the speed of the device exceeds a predetermined speed. The predetermined speed (i.e., threshold speed) may be set to differentiate a person that is moving in automobiles, for example, from a person that is riding a bicycle or train. As examples of other cases, the estimated location of a mobile device may indicate a person is off-road or riding a train, based on cross referencing the known location of roads with the estimated location of the mobile device, and features of the mobile device may remain fully enabled despite that the mobile device is above a threshold speed.

Disclosed embodiments may uses GPS-based technology for determining the speed of a mobile device. In the alternative or in addition to GPS-based technology, tower triangulation using, for example, a cellular telephone network may be used to estimate the speed of a mobile device. For tower triangulation, it would be ideal to use at least three towers to accurately pinpoint a first location, a second location, and the time it takes a mobile device to travel between the two locations. However, in some cases multiple towers may not be necessary to estimate that a mobile device is exceeding a threshold speed.

In some embodiments, emergency calls such as 911 calls are allowed regardless of the speed of the mobile device. In addition, embodiments in which the mobile device is a multi-function device that, for example, permits the playback of music, certain features of the mobile device may remain enabled and certain features may be disabled. For example, some telephone operations (e.g., manual dialing) may be disabled, while hands-free operations are enabled. Further, functions for permitting the playback of audio content may be enabled regardless of the speed of the device. Such features for allowing certain functionality from the mobile device regardless of speed may be subject to parental or administrator approval. In some embodiments, a mobile device or provider network may consult a table of state or local regulations and turn OFF certain operations only when required by law. For example, if Wyoming permits cell phone operation while driving, the device has telephone features that remain operational on Wyoming highways but are turned OFF in other locations, such as in New York. Some embodiments may turn OFF all functionality in school zones. Embodied mobile devices may issue warnings at high speeds instead of terminating operation, or alternatively, may power down completely at high speed. Such features may be configurable by a parent, employer or other administrator.

Parents or other administrators may control whether an embodied mobile device remains operational under certain predetermined conditions. If a parent deems it acceptable for a child to talk on a cellular telephone while driving, the parent may configure the child's cellular telephone to allow such operation. However, if a parent feels that sending text messages or other text-based operations during driving is particularly dangerous, the parent may configure the child's cellular telephone or mobile device to restrict access to all text-based functionality at a threshold speed.

There are multiple methods that may be used to determine the speed of a mobile device. First and second locations may be determined and the time it takes for the mobile device to traverse the distance between the locations may be used to calculate a speed. Accordingly, embodied systems for determining the speed at which a mobile device is traveling may assume that the mobile device is on a road and cross reference distance information associated with the road. The cross referenced distance information can be used to determine the average speed at which a mobile device is traveling.

In some cases, the mobile device may only have access to one or two towers. In such cases, the speed in which a mobile device is traveling may still be estimated in some situations. For example, if only one tower is in communication with the mobile device, a first and second ping signal may be sent between the mobile device and the tower and the time difference for receiving the ping signals may be used to calculate the speed of the mobile device relative to the tower. Such a system of estimating speed using one tower only works well if the mobile device is headed directly away from the tower. On the contrary, if the mobile device is headed in a perfect circle around the tower, the one tower method of estimating speed works poorly because the time for the ping signal to travel between the mobile device and the tower would be virtually identical for each ping. If the mobile device is headed away from the tower "at an angle," and the angle is near enough to directly away from the tower to give an indication that the mobile device exceeds a threshold speed, then estimation of speed using one tower may be good enough. For example, if the mobile device is traveling at 60 mph the tower, and the time difference between the first and second pings indicates a speed of 40 mph, then the feature set could still be disabled from the mobile device if the threshold speed were 30 mph. In summary, using only one tower to estimate the speed of the mobile device, it is possible that it may yield erroneous results if the direction of the mobile device approaches or simulates a circle around the tower. Therefore, location sensing using a one tower approach would not be very accurate. In some embodiments, a feature set is disabled based on a determination or estimation that the mobile device is within a restricted area. If the restricted area includes the entire coverage area of one tower, the feature set may correctly be disabled if it is determined that the mobile device is within the coverage area of the one tower.

If two towers are within range of the mobile device, the speed of the mobile device may be estimated more accurately than using only one tower. Using a ping or pings sent between two towers and the mobile device may result in accurately determining the speed of the mobile device but not knowing in which of two areas the mobile device is located. In other words, using only two towers, the same results from pinging may be calculated if the mobile device is moving in either of two lines that would be on opposite sides, and form a mirror image of each other, of a line between the two points. Again, location based actions (e.g., disabling features of the mobile device based on its location) may be taken if both of the estimated locations of the mobile device are within a restricted area. If only one of the possible locations are within the restricted area, then the mobile device or provider network may disable the feature set.

Modern mobile communication devices such as cellular telephones may be equipped with internal GPS functionality that works using orbiting satellites. This capability may be used by embodied systems to estimate the location of the mobile device at two separate points, to estimate the speed of the mobile device based on the time it takes to travel between the two points, to use the estimated speed to determine whether a feature set should be disabled based on the speed of the mobile device, and to act accordingly to disable the feature set according to predetermined rules. GPS systems may use triangulation methods similar to the tower triangulation methods disclosed and discussed above.

For triangulation using towers or satellites, each clock in every transceiver may have to be synchronized very accurately. Service provider towers (e.g., cell phone towers) and GPS satellites may have multiple atomic clocks that serve as working clocks, backup clocks, and clocks for keeping the working clocks and backup clocks in synchronization. When a transceiver within either a tower, a GPS satellite, or the mobile device receives a signal, a time included in the signal is immediately recorded. The difference between the send time and the current time is used to determine the time lapse between sending and receiving the signal. For example, the transceiver might find that the lapse is 0.2 seconds. Using the formula of "distance=velocity*time," with velocity through air for radio signals estimated at 186,000 mi/sec, a distance from the satellite is estimated at 37,200 miles for a travel time of 0.2 seconds. After determining the mobile devices distance from three or more satellites, a mobile device can accurately determine the latitude, longitude, and altitude of the mobile device. Altitude may be used to disable certain functionality of a mobile device during an airplane flight, for example.

In some cases, a unique identity number associated with a mobile device is uploaded through a satellite or tower-based system and used to access a set of rules for the mobile device. In some cases, an administrator (e.g., an employer) may wish to disable a feature set (e.g., manually dialing outgoing calls) for employees traveling more than 5 mph through a school zone. If an embodied system determines that a mobile device associated with the unique identity number is traveling 10 miles per hour in a school zone, and the embodied system accesses rules set by the administrator that the feature set should be disabled, the feature set including outgoing calls would be disabled until the employee is detected to have slowed down, left the school zone, or both.

In the following description, examples are set forth with sufficient detail to enable one of ordinary skill in the art to practice the disclosed subject matter without undue experimentation. It should be apparent to a person of ordinary skill that the disclosed examples are not exhaustive of all possible embodiments. As will be appreciated by one of ordinary skill in the art, the environments of the present disclosure may be systems, methods, data processing systems, and/or computer program products on tangible computer readable media. It should be understood that methodologies and systems as disclosed herein may be implemented by computer program instructions. The computer program instructions may be provided to a processor of a general purpose computer, special purpose computer, or other programmable data processing apparatus to produce a machine, such that the instructions which execute via the processor create a means for implementing the functions specified in the flowcharts and/or block diagram blocks disclosed herein. Disclosed embodiments may combine software and hardware aspects. Embodiments of the present disclosure may take the form of computer program products stored on computer usable storage media having computer-usable program code of instructions embodied in the media. Any suitable computer readable media may be utilized including hard disks, CD-ROMs, solid state memory, optical storage devices, transmission media such as those supporting the Internet or an intranet, or magnetic storage devices. The programming code may execute on a computer associated within an automobile, entirely on board a mobile device such as a smart phone, as a stand-alone software package, partly on a user's mobile device and partly on a service provider network's server, or entirely on a remote computer such as a service provider network server. Regarding reference numerals used to describe elements in the figures, a hyphenated form of a reference numeral refers to a specific instance of an element and an un-hyphenated form of the reference numeral refers to the element generically or collectively. Thus, for example, element 101-1 refers to an instance of a satellite, which may be referred to collectively as satellites 101 and any one of which may be referred to generically as a satellite 101.

FIG. 1 illustrates a mobile device 105 which has functionality that is managed based upon predetermined conditions in accordance with disclosed embodiments. Mobile device 105 includes a speed determination subsystem (not depicted) that estimates a speed of the mobile device. As shown, mobile device 105 is intended to be depicted within automobile 107. Therefore, if mobile device 105 is determined to be traveling at 45 mph, for example, it can be assumed that automobile 107 is also traveling at 45 mph. Mobile device 105 uses GPS receivers (not depicted) to receive signals from satellites 101. In some cases, mobile device 105 may include an internal clock that is synchronized with internal clocks contained in satellites 101. As shown, mobile device 105 continuously receives signals from satellites 101-1, 101-2, and 101-3. Based on the times at which such signals are received, a location determination unit within mobile device 105 may triangulate a location of mobile device 105. By triangulating the location of mobile device 105 in two locations and determining the time that it takes the mobile device to traverse the distance between the two locations, a speed of mobile device 105 may be estimated. In other embodiments, satellites 101 may receive signals that are transmitted by mobile device 105 and communicate with each other or with base station 103 to estimate consecutive locations and accordingly, the speed of mobile device 105.

Figure 2:
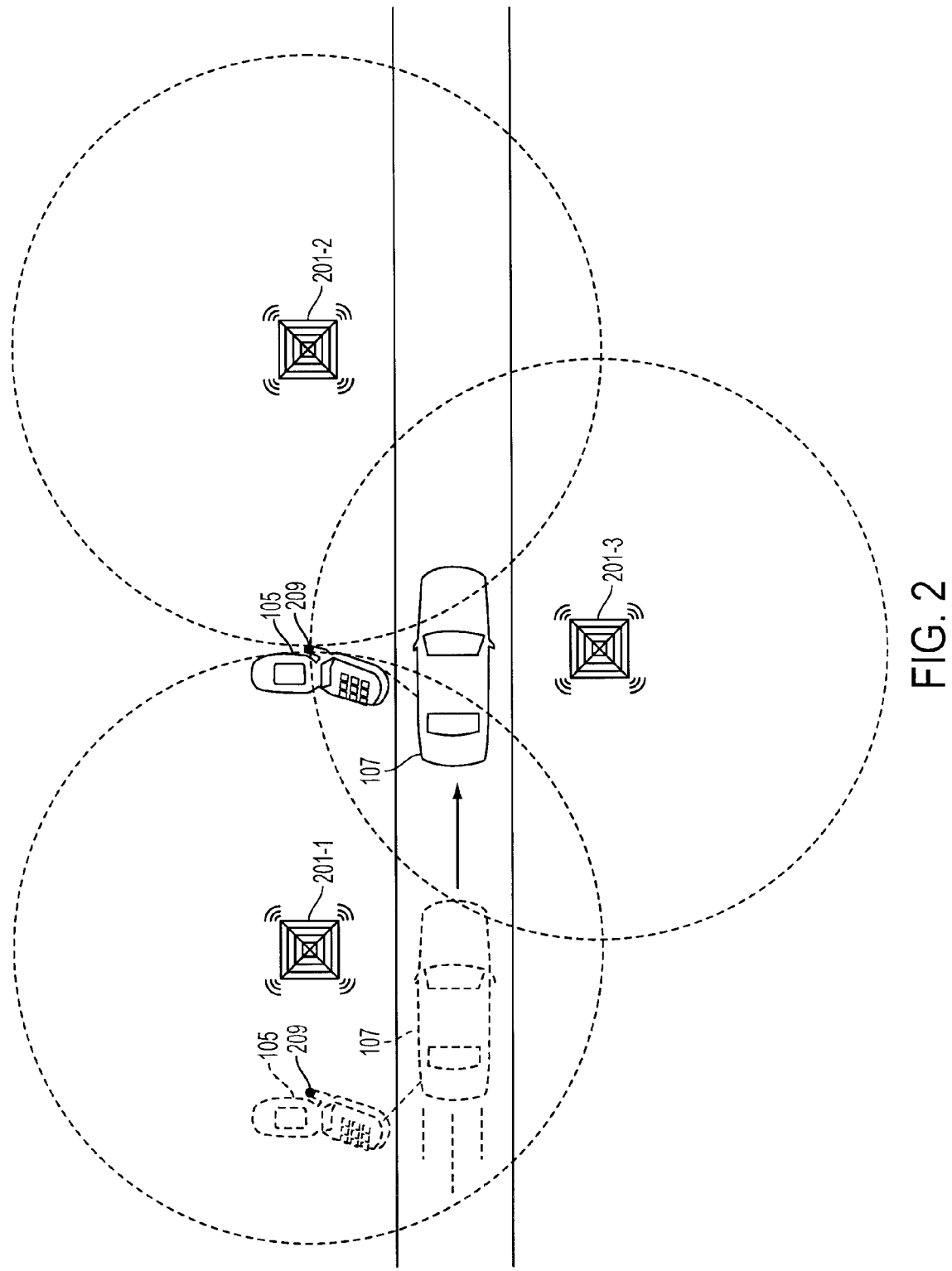
FIG. 2 illustrates an exemplary environment for detecting predetermined conditions using tower triangulation and managing the use of mobile devices in accordance with disclosed embodiments.

FIG. 2 illustrates an environment in which tower triangulation is conducted to estimate consecutive locations and the speed of travel of mobile device 105, and consequently to calculate the speed of automobile 107. Each tower 201 may emit a microwave signal or radio signal that is received by mobile device 105. Alternatively or in addition, each tower 201 may receive a microwave signal or radio signal emitted from mobile device 105. In such a case, each tower 201 receives the signal at a different time, assuming the mobile device 105 is not exactly equidistant from the towers 201. The time it takes for the signal to reach tower 201-1 may be used to calculate a circle around tower 201-1 equal to the estimated distance of mobile device 105 from tower 201-1. Accordingly, circles may be "drawn" around every tower 201. As shown in FIG. 2, the intersection of the three circles is the location 207 of mobile device 105. Using location 207, a previously calculated location 209, and a time that it takes for the mobile device to travel between the two distances, a speed detection system may accurately estimate a speed for mobile device 105. Calculations and determinations using tower triangulation should occur rapidly enough to account for curves in a road or differences in elevation that may otherwise skew results. In some cases, speed determinations may be repeatedly made and an average speed may be used to determine whether to disable functionality of mobile device 105. Also, it may be necessary to account for the reflection of signals using the tower triangulation method. Systems that rely on tower triangulation methods may be confused by the reflection of signals from objects such as steel frame buildings, water towers, communication towers, and other such obstructions. For this reason, at least two independent triangulation determinations should be made to confirm the speed of the mobile device to ensure that a feature set is disabled under the correct circumstances. Also, rule sets may be used to discard obviously erroneous data. For example, if a car is calculated to be driving at 400 mph, the data may be disregarded as obviously erroneous under a set of predetermined rules.

Figure 3:
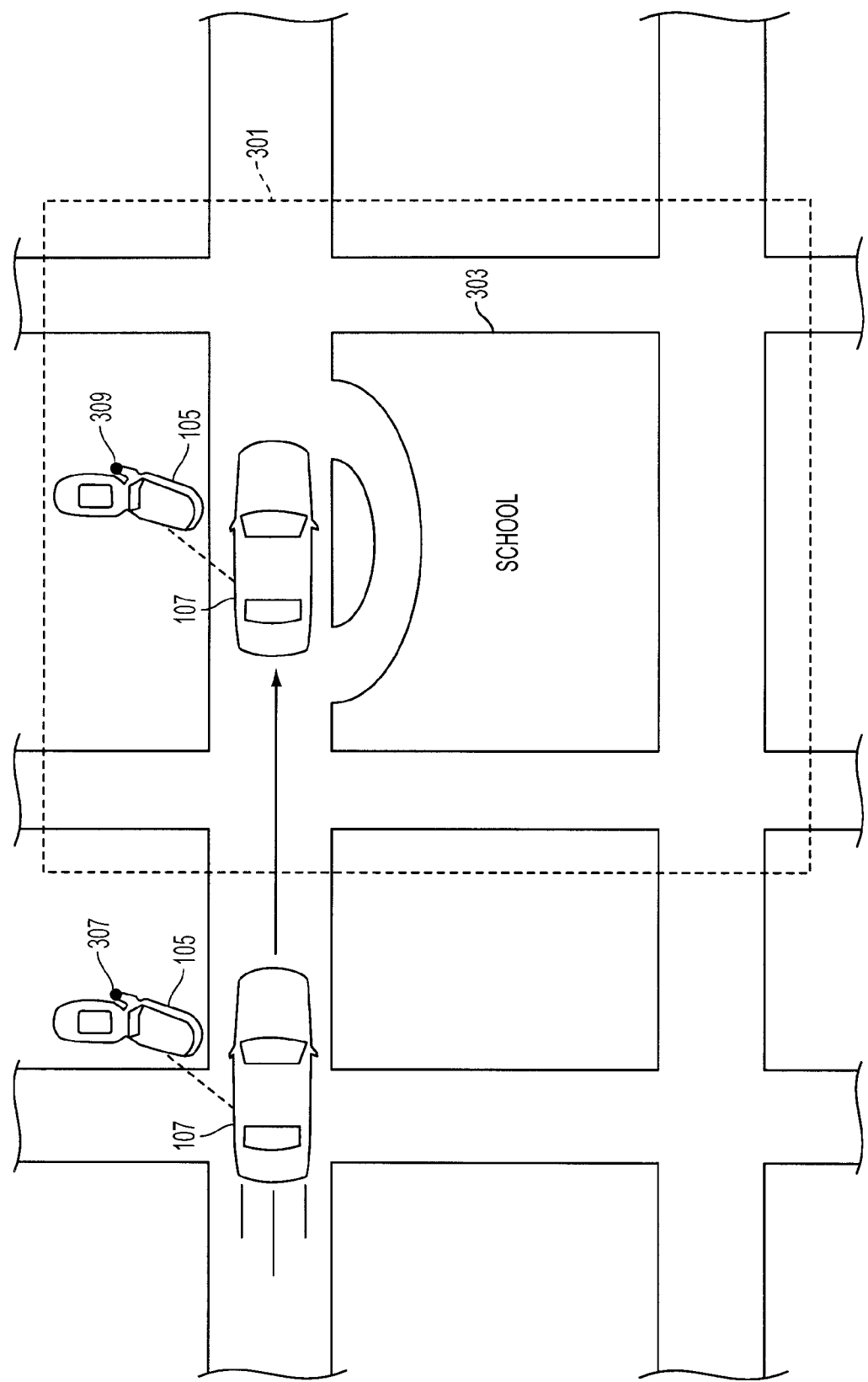
FIG. 3 illustrates a mobile device traveling into a restricted area in which features of the mobile device may be managed in accordance with disclosed embodiments.

FIG. 3 depicts mobile device 105 (and automobile 107) traveling into a restricted area (i.e. school zone 301) in which features of the mobile device may be managed in accordance with disclosed embodiments. As shown, school 303 is within school zone 301. Also, as shown at a first time, automobile 107 and mobile device 105 are outside of school zone 301 (i.e., the restricted zone) at location 307. However, at a second time, mobile device 105 and consequently automobile 107 are determined to be at location 309 within school zone 301. In response, a feature set of mobile device 105 may be disabled. In some embodiments, modules within mobile device 105 or within a service provider network (not depicted) in communication with mobile device 105 may access a database of local rules or restrictions regarding when certain functionality of mobile device 105 is illegal. For example, if making or receiving any calls is restricted for mobile devices (e.g., mobile device 105) within school zone 301 according to local ordinances, corresponding functionality of mobile device 105 may be disabled temporarily while mobile device 105 is determined to be underway at any speed within school zone 301.

Figure 4:
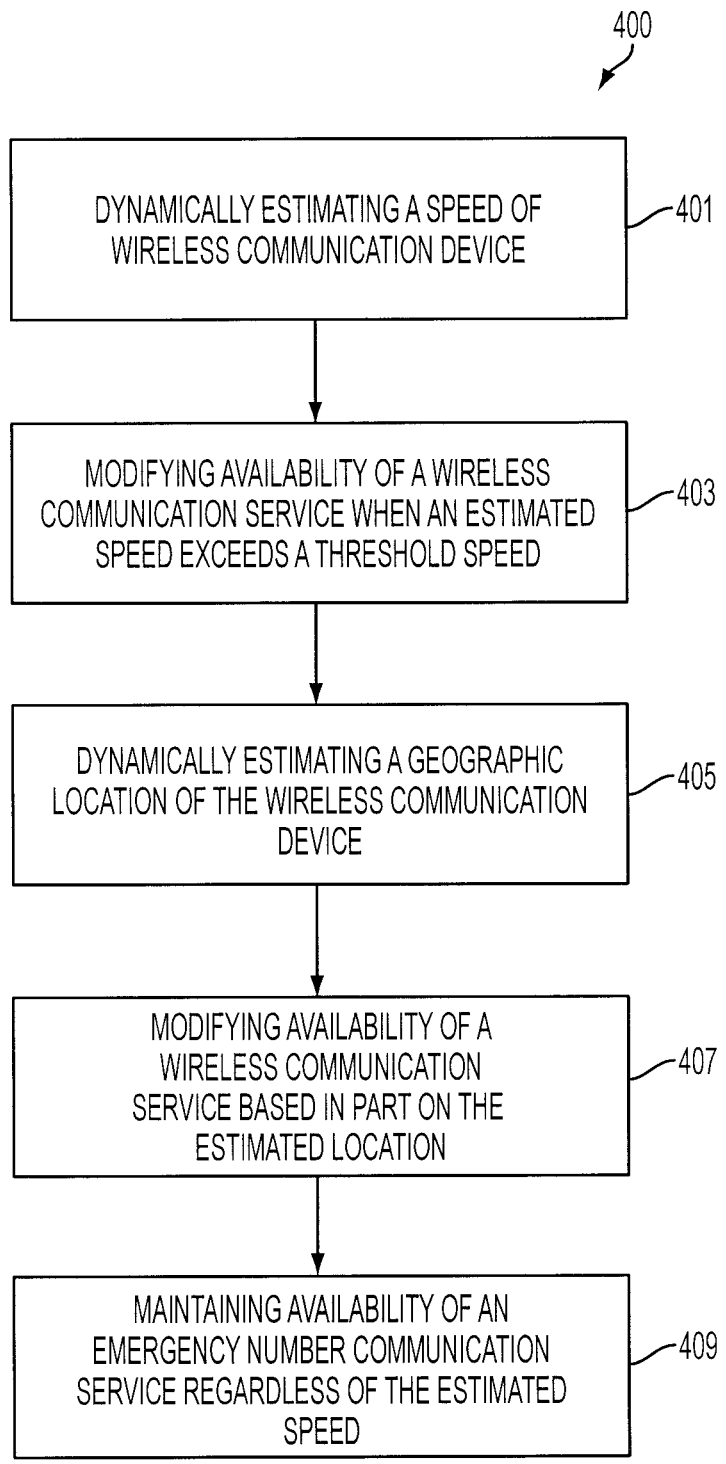
FIG. 4 illustrates a methodology for managing operation of a mobile device under predetermined conditions in accordance with disclosed embodiments.

FIG. 4 depicts selected operations of an embodiment of a method 400 for managing functionality of a mobile device under predetermined conditions. As shown, method 400 includes dynamically estimating (operation 401) a speed of a wireless communication device. The availability of a wireless communication service is modified (operation 403) when an estimated speed exceeds a threshold speed. A geographic location of the wireless communication device is estimated (operation 405). The availability of wireless communication services is modified (operation 407) based in part on the estimated location. The availability of emergency number communication services is maintained (operation 409) regardless of the estimated speed of the wireless communication device.

Figure 5:
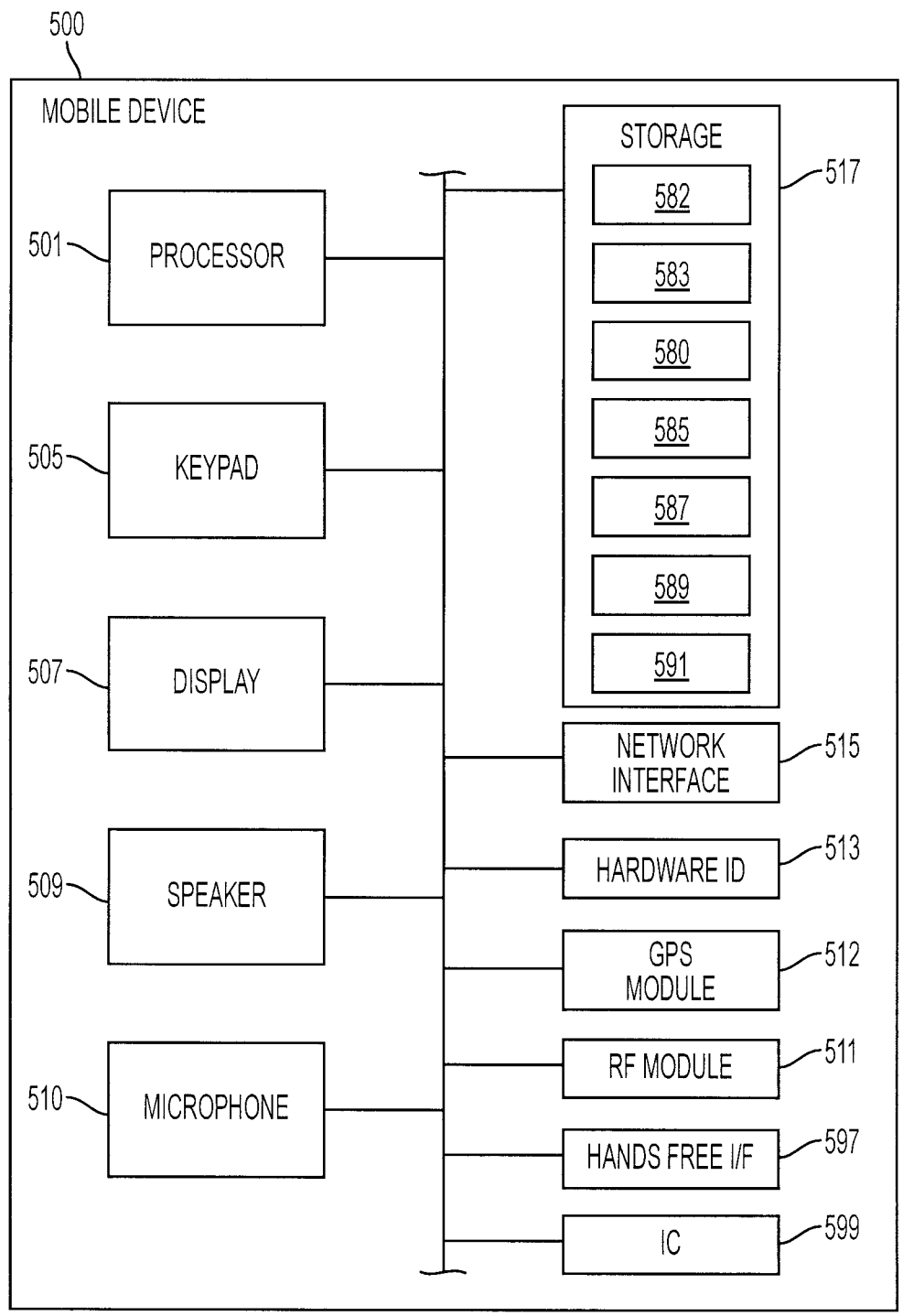
FIG. 5 is a block diagram of selected elements of a mobile device which, in accordance with disclosed embodiments, may have its functionality altered under predetermined conditions.

Referring now to FIG. 5, an embodiment of a mobile device 500 is illustrated. As shown, mobile device 500 includes processor 501 and general purpose storage 517 connected to a shared bus. In accordance with disclosed embodiments, processor 501 is adapted to disable at least one feature of mobile device 500 if its speed exceeds a threshold speed (e.g., 35 mph). Storage 517 may include disk drives, non-volatile memory, and random access memory, as examples. Storage 517 may include an operating system and other computer readable instructions for providing mobile device 500 with functionality for detecting predetermined conditions and modifying the functionality of mobile device 500 or modifying a feature set of mobile device 500 based on rules regarding the predetermined conditions. Storage 517 may be used for storing a unique hardware address or globally unique identifier for mobile device 500. As shown, mobile device 500 includes keypad 505 for accepting user input for manually dialing a telephone number, for example. Display 507 is enabled for displaying notifications, for example, that functionality of mobile device 500 has been limited. In some embodiments, display 507 is a touch screen used for receiving user inputs for dialing telephone numbers. Speaker 509 is for presenting audio portions of received telephone calls and for presenting audible warnings, for example, to users of mobile device 500. Microphone 510, RF module 511, and GPS module 512 are included in mobile device 500 to support its combined functionality as a mobile telephone and navigation device. In some embodiments, GPS module 512 is used by speed detection systems and location detection systems to determine whether mobile device 500 should have its functionality altered. RF module 511, in some embodiments, is a receiver adapted to receive local regulation data that is indicative of prohibited communication features. RF module 511 may also receive speed data regarding speed or velocity of mobile device 500 as it is determined by a service provider network, a mechanical speed detection device within an automobile, external speed detection devices, and the like. Similarly, network interface 515 may be a wired or wireless connection to an IP protocol network, for example, to allow mobile device 500 a further means for communicating or determining its location and speed. For example, network interface 515 may be used to establish a Bluetooth connection or other type connection with a vehicle based system for dynamically receiving the speed of mobile device 500.

Hardware identifier 513, as shown, is separate from storage 517, but may be incorporated therein. Hardware identifier 513 may be an international mobile equipment identity (IMEI) or any number that is effectively unique to mobile device 500. Such IMEI numbers may be used by a content provider network to identify valid devices and to stop a stolen phone from accessing the network, for example. In addition, hardware identifier 513 may be used by a service provider network, in conjunction with a speed of mobile device 500, to determine whether mobile device 500 should have its functionality in accordance with disclosed embodiments. For example, if an administrator registers mobile device 500, which has a particular hardware identifier 513, as requiring text messaging to be disabled at any speed, then a service provider may remotely disable text messaging features of mobile device 500 or may withhold sending text messages to mobile device 500 until mobile device 500 is determined to be at rest. Mobile device 500 includes hands-free interface 597, which may retain its functionality to allow a user to perform hands-free operations including answering incoming calls and dialing outgoing calls, if allowed.

As shown, mobile device 500 includes speed determination system 582, navigation system 583, audio system 585, location determination system 587, notification system 589, feature set module 580, and hands-free system 591. Speed determination system 582 and other elements within storage 517 may be a set of computer readable instructions stored on computer readable media (i.e., storage 517). Speed determination system 582 communicates through GPS technology or tower triangulation through network interface 515 and/or RF module 511 to estimate the speed of mobile device 500. Navigation system 583 may permit a user of mobile device 500 to receive point-to-point instructions. Such functionality may remain in place regardless of the speed of mobile device 500; however, input of addresses and other such features may be disabled at speed. Audio system 585 may be used to play audio files at any speed in some embodiments. However, selection of audio files to be played, for example, may be limited depending upon options that may be set in feature set 580 by an administrator, employer, or parent.

Feature set module 580 may embody a rule system for determining whether mobile device 500 is in a restricted area based on rules data relevant to an estimated geographic location of the mobile device. Accordingly, feature set module 580 disables certain features if mobile device 500 is in a restricted area or is traveling at or above a threshold speed. In some embodiments, feature set module 580 permits emergency dialing (e.g., dialing 911) under any circumstance regardless of speed or geographic location of mobile device 500. Location determination system 587 may be used to determine multiple locations of mobile device 500, and the time between measurements may be used to estimate a speed of mobile device 500. In accordance with disclosed embodiments, location determination system 587 estimates a geographic location of mobile device 500, and processor 501 is adapted to disable at least one feature of mobile device 500 if the geographic location is within a restricted geographic area (e.g., a school zone). Hands-free system 591 may include functionality for hands-free dialing and hands-free answering, as examples. Hands-free system 591 may also support audio system 585 for voice-based selection of audio tracks to be played. Further, hands-free system 591 may support navigation system 583 for hands-free selection of destination points, for example. In this way, if feature set module 580 is programmed to allow hands-free operation at speed, hands-free system 591 may support voice recognition to permit the user of mobile device 500 to accomplish allowed actions.

As shown in FIG. 5, integrated circuit (IC) 599 may include presently known or later discovered circuit elements and sensors for determining the location and/or speed of mobile device 500. For example, it may include accelerometers and other motion detection sensors that accurately estimate speed and/or successive locations of mobile device 500. Alternatively, it may detect movement through a static magnetic field (e.g., the Earth's magnetic field) to estimate the speed of mobile device 500. Such examples of the functionality of IC 500 are intended to be illustrative and not limiting. As will be appreciated by those of skill in the art, a location detection system or speed detection system may incorporate or access a GPS receiver that may be integrated into a vehicle and/or into embodied wireless communication devices. In some cases, an embodied wireless communication device communicates with mechanical-based speed detection equipment in a vehicle or with vehicle based GPS receivers. As used herein, the terms "wireless communication device" or "mobile device" may include, but are not limited to, a cellular wireless terminal with or without a multi-line display; a Personal Communications System (PCS) terminal that may combine a cellular wireless terminal with data processing, facsimile and data communications capabilities; a smart phone or a PDA that can include a wireless terminal, pager, web browser, organizer, calendar and/or a GPS receiver; a two-way wireless communication, a vehicle integrated cellular and/or satellite based wireless terminal that may include a GPS receiver; and a conventional laptop and/or palmtop receiver or other appliance that includes a wireless terminal transceiver. Wireless communication devices or mobile devices may also be referred to as "pervasive computing" devices and may be mobile terminals. In certain embodiments, wireless communication devices or mobile devices include antennas that can be configured to provide resonance for a GPS and the devices can include a GPS receiver.

While the disclosed subject matter has been described in connection with one or more embodiments, the disclosed embodiments are not intended to limit the subject matter of the claims to the particular forms set forth. On the contrary, disclosed embodiments are intended to encompass alternatives, modifications, and equivalents.

What is claimed is:

1. A mobile device, comprising:
a processor; and
memory storing instructions that, when executed by the processor, cause the processor to perform operations, the operations comprising:
retrieving parental controls governing operational features of the mobile device;
determining a location and a speed at which the mobile device travels;
storing a database that associates different locations to functional restrictions;
querying the database for the location;
determining the location matches a school zone in the database;
retrieving an illegal functionality from the database that is associated with the school zone;
determining the speed exceeds zero;
disabling one of the operational features of the mobile device that corresponds to the illegal functionality in response to the location matching the school zone at any speed;
querying the parental controls for the speed at which the mobile device travels;
retrieving parental rules associated with excessive speed; and
modifying another one of the operational features of the mobile device according to the parental rules.

2. The mobile device of claim 1, further comprising a global positioning system module to receive global positioning system signals.

3. The mobile device of claim 2, wherein the operations further comprise determining, from the global positioning system signals, the location of the mobile device.

4. The mobile device of claim 1, wherein the operations further comprise enabling hands-free operation regardless of the speed of the mobile device.

5. The mobile device of claim 1, wherein the operations further comprise disabling a manual incoming call answering feature.

6. The mobile device of claim 1, wherein the operations further comprise disabling a call dialing by hand.

7. The mobile device of claim 1, wherein the operations further comprise enabling emergency number dialing regardless of the speed of the mobile device.

8. The mobile device of claim 1, wherein the operations further comprise enabling 911 calls regardless of the speed of the mobile device.

9. The mobile device of claim 1, wherein the operations further comprise disabling outgoing text messages.

10. The mobile device of claim 1, wherein the operations further comprise disabling incoming text messages.

11. The mobile device of claim 4, wherein the operations further comprise:
determining estimated distances between the mobile device and a plurality of cellular towers; and
triangulating the location based on the estimated distances.

12. A method comprising:
determining, by a processor, locations and an estimated speed at which a wireless communication device travels;
determining the locations encircle a coverage area of a single cellular tower;
retrieving from memory a threshold speed;
storing a database that associates different locations to functional restrictions;
querying the database for one of the locations;
determining the one of the locations match a school zone in the database;
retrieving an illegal functionality from the database that is associated with the school zone;
determining, by the processor, the estimated speed exceeds zero;
disabling one of the operational features of the mobile device that corresponds to the illegal functionality in response to the one of the locations matching the school zone at any speed;
disabling a set of the operational features of the mobile device in response to the locations encircling the coverage area of the single cellular tower;
retrieving parental controls governing operational features of the mobile device;
querying the parental controls for the speed at which the mobile device travels;
retrieving parental rules associated with excessive speed; and
modifying another one of the operational features of the wireless communications device according to the parental rules.

13. The method according to claim 12, further comprising maintaining emergency calls to an emergency number regardless of the estimated speed.

14. The method according to claim 12, further comprising maintaining availability of hands-free features of the wireless communication device regardless of the estimated speed.

15. A memory storing instructions, which when executed by a processor, cause the processor to perform operations, the operations comprising:
determining locations and an estimated speed at which a wireless communication device travels;
determining the locations encircle a coverage area of a single cellular tower;
determining the speed exceeds a threshold;
storing a database that associates different locations to functional restrictions;
querying the database for one of the locations;
determining the one of the locations match a school zone in the database;
retrieving an illegal functionality from the database that is associated with the school zone;

retrieving parental controls governing operational features of the wireless communication device;

disabling one of the operational features of the mobile device that corresponds to the illegal functionality in response to the one of the locations matching the school zone at any speed;

disabling a set of the operational features of the mobile device in response to the locations encircling the coverage area of the single cellular tower;

querying the parental controls for the speed at which the wireless communication device travels;

retrieving parental rules associated with excessive speed; and modifying another one of the operational features of the wireless communication device according to the parental rules.

16. The memory of claim 15, wherein the operations include maintaining availability of an emergency number communication service regardless of the estimated speed.

17. The memory of claim 15, wherein the operations include maintaining availability of hands-free features of the wireless communication device when the estimated speed exceeds the threshold speed.

\* \* \* \* \*